United States Patent Office 3,492,214
Patented Jan. 27, 1970

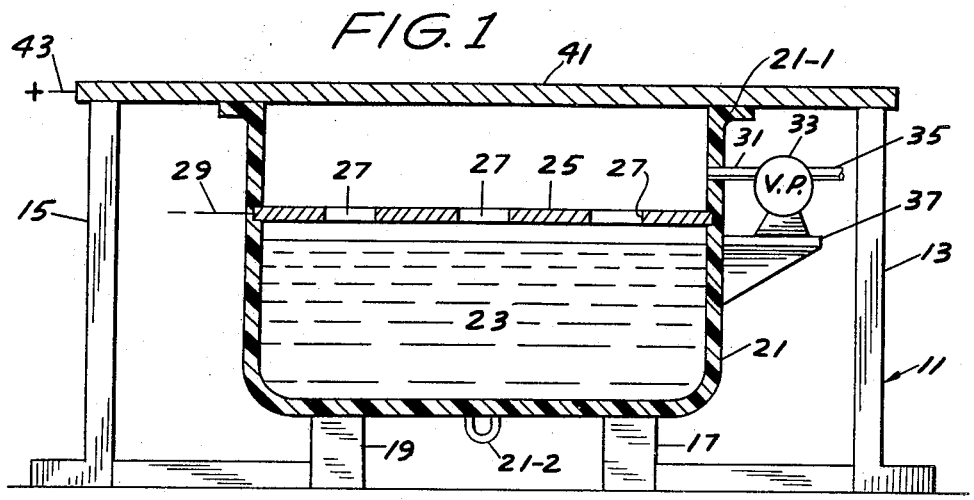
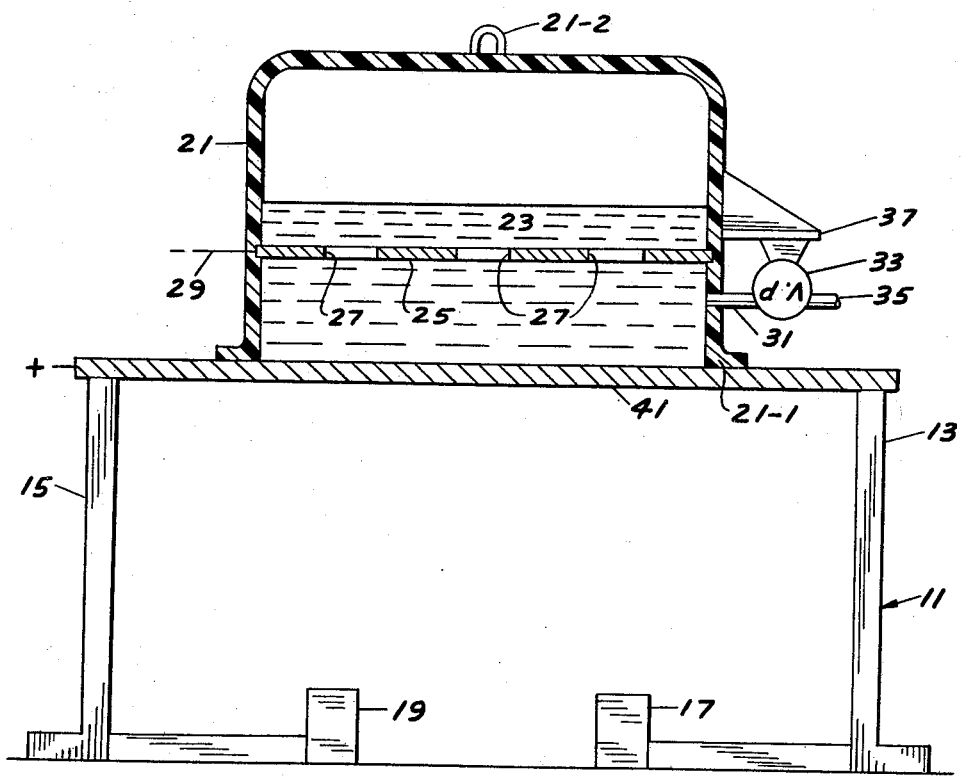

3,492,214
DESIGN COATING BY ELECTRODEPOSITION
Jerry G. Beck, Southfield, Mich., assignor to Ford Motor Company, Dearborn, Mich., a corporation of Delaware
Filed July 3, 1967, Ser. No. 650,799
Int. Cl. C23b *13/00;* B01k *5/02*
U.S. Cl. 204—181                                 4 Claims

ABSTRACT OF THE DISCLOSURE

The method and means of forming a design coating upon an electrically conductive workpiece which comprises positioning the workpiece over a vessel having an opening defined by a peripheral lip of predetermined configuration, positioning a first electrode in relation to a resin-containing coating bath so as to be in contact with said bath when said vessel is inverted, providing a watertight seal between said peripheral lip and said workpiece, inverting said workpiece and said vessel, providing a difference of electrical potential between said electrode and said workpiece sufficient to cause a direct current of electrical energy to pass through said bath between said electrode and said workpiece with resultant electrodeposition of a continuous film of said resin upon that portion of the surface of said workpiece in contact with said bath and essentially defined by said lip, inverting said vessel and said workpiece and breaking said seal.

Background of the invention

The art of electrophoretic deposition of organic materials from colloid dispersions of the same is widely described in the literature. Such materials include rubber, wax, polyeterafluoroethylene, natural resins, and certain nonionic synthetic polymers. More recently, industrial electrodeposition of paint has become a reality through a method of electrodeposition utilizing ionized macromolecules to produce upon conductive substrates resinous paint films which exhibit high electrical resistance. The resins most suitable for this purpose are polycarboxylic acid resins, i.e. organic resins having dissociable carboxyl groups in their molecular structure. These are dispersed in an aqueous bath with water soluble amines or similar water soluble amino compounds.

In this method of painting, the workpiece serves as one electrode of an electrodeposition cell and the aqueous dispersion of paint extends between the workpiece and another electrode while a direct current of electrical energy is passed through this dispersion with resultant electrodeposition of a resin film upon the workpiece. This film rapidly achieves high electrical resistance causing further deposition to be made on uncoated or lightly coated areas of the workpiece where the current density is initially less than at the areas first coated but is still within the effective coating range of the electrode system employed. In the electrodeposition of a polycarboxylic acid resin, the workpiece serves as the anode of the electrodeposition cell and the noncoating electrode serves as the cathode. A number of such resins and the process above is described by Gilchrist in U.S. Patent 3,230,162 and by Huggard in U.S. Patent 3,297,557 which patents are incorporated herein by reference. Cathodically depositable resins are also known. These have ionizable groups in their molecular structure which exhibit positive sites upon dispersion in an aqueous bath.

Ordinarily, electrodeposition of coating materials as hereinbefore and hereinafter described is effected by immersing the workpiece in an aqueous coating bath. Such deposition can also be effected by passing a continuous stream of the dispersion in contact with an electrode and simultaneously in contact with the workpiece while providing a sufficient difference of electrical potential between the electrode and the workpiece to effect electrodeposition of a water-insoluble film of such coating material from the stream onto the workpiece.

The depth of such film can be varied by varying the effective potential applied with resultant variance of current density at the workpiece surface, the residence coating time, the formulation of the coating bath, etc. Ordinarily, such film will be deposited to a depth of above about 0.3 mil, more commonly to a depth in the range of about 0.5 to about 1.25 mils or higher. The electrical resistance of the film is directly proportional to its depth in contrast to materials that form a porous deposit. This resistance builds rapidly and limits coating depth at a given constant voltage under any given electrode arrangement. The electrical resistance of such film after polymerization is above about 1 million ohm-cm., frequently above about 10 million ohm-cm. Such resistance is lower prior to curing of the film but is even then quite high. As the film resistance builds in the first coated areas, coating is effected upon shielded or more remote areas of the workpiece provided that such exist and that a current density sufficient to initiate coating thereon can be developed at such surfaces with the existing electrode arrangement. Eventually, no further coating is possible at the given voltage.

Summary of the invention

Broadly, this invention, is concerned with method and means for partially coating an electrically conductive workpiece so as to effect a design coating thereon. In one embodiment, this invention is concerned with electrodepositing paints of different visual appearance upon an electrically conductive workpiece in predetermined design. Thus, two or more paints may be electrodeposited upon separate portions of a conductive workpiece in predetermined design. Such paints may vary in color or texture or the separate areas may be coated with paints of common color but which vary in hue, tone, or intensity.

In the method of this invention, the coating bath is contained in a vessel which is preferably formed of nonconductive material. An electrode is positioned therein or forms a portion of the walls thereof so as to be in contact with the bath when the vessel is inverted. The mouth of the vessel is of predetermined configuration and is provided with sealing means by means of which a watertight seal is effected with a surface of the workpiece.

The workpiece and the vessel are then inverted to bring the coating bath in the vessel into contact with that portion of the workpiece surface circumscribed by the seal. A difference of electrical potential is provided between the aforementioned electrode and the workpiece and a direct current of electrical energy is passed through the bath between such electrode and the workpiece thereby effecting electrodeposition of paint from the bath upon the workpiece. Electrodeposition is preferably continued until terminated at the applied voltage by the building electrical resistance of the film. The workpiece and the vessel are again inverted, the seal is broken and the workpiece is removed. It will be understood that a plurality of such vessels may be attached to a workpiece with coating effected therefrom simultaneously or a plurality of connections may be made between the workpiece and the same vessel at different areas on the workpiece.

The vessel may be completely or partially formed of metal in which case the vessel itself may serve as the electrode of opposite polarity to the workpiece. If a metal vessel is used, a nonconductive material such as rubber will form at least a portion of the sealing means so as to prevent direct contact between the metal of such vessel and the workpiece.

After the workpiece has been removed from the vessel, the electrodeposited coating is polymerized by baking or other conventional curing means. The workpiece is then immersed in a second coating bath containing an aqueous dispersion of paint. The workpiece again serves as one electrode of an electrodeposition cell and paint from the second bath is electrodeposited upon the workpiece at a voltage insufficient to effect water-insoluble deposition of paint over the area covered by the previously deposited and cured paint.

Brief description of the drawing

FIGURE 1 is a schematic representation of one embodiment of apparatus suitable for use in carrying out the method of this invention, said apparatus being shown in the position of assembly, and FIGURE 2 is a schematic representation of the apparatus shown in FIGURE 1 in the coating position.

Description of the preferred embodiments

Referring now to FIGURE 1, there is shown support means 11 having a pair of upstanding outer support members 13 and 17 and a pair of upstanding inner support members 17 and 19. Resting upon support members 17 and 19, there is shown a nonconductive coating vessel 21 which may be constructed of rubber or other suitable material. Vessel 21 contains a coating bath 23, an aqueous dispersion of polycarboxylic acid resin and pigment. Bath 23 is hereinafter more fully described.

Situated in an intermediate position within and supported by the walls of vessel 21 is a plate-like electrode 25 having a plurality of openings 27 therein. Conductor 29 provides electrical connection between electrode 25 and negative terminal of a direct current electric power source, not shown.

A conduit 31 in fluid communication with the interior of vessel 21 is in operative connection with a pump 33 and conduit 35. Pump 33 is seated upon a braced support 37 which in turn is supported by vessel 21. The principal opening of vessel 21 is defined by a peripheral lip 21–1.

Resting upon outer members 13 and 15 and in contact with lip 21–1 of vessel 21 is an electrically conductive workpiece 41, i.e. a metal sheet. Conductor 43 provides electrical connection between the workpiece 41 and a positive terminal of a direct current electric power source, not shown.

In operation, a water-tight seal is effected between lip 21–1 of vessel 21 and the workpiece 41 by evacuating air from the interior of vessel 21 and the workpiece 41 by vacuating air from the interior of vessel 21 via conduit 31, pump 33 and conduit 35 so as to form a partial vacuum within vessel 21. The vessel 21 and the workpiece 41 are then inverted as shown in FIGURE 2 which causes bath 23 within vessel 21 to flow through the holes 27 and to contact the area of workpiece 41 which is essentially defined by lip 21–1, i.e. the area to be coated.

A difference of electrical potential in the range of about 0 to about 500, commonly 100 to 300 volts, is provided between electrode 25 and the workpiece 41 and electrodeposition of resin from bath 23 is effected over the area on workpiece 41 defined by the seal of vessel 21 to workpiece 41. When deposition has preceded to completion at the voltage provided, or sooner if desired, the power is turned off, vessel 21 and workpiece 41 are inverted to the position shown in FIGURE 1, the seal is broken and workpiece 41 is removed.

It will be understood that the vacuum seal shown is purely illustrative. The sealing of the coating vessel to the workpiece may be effected by any suitable sealing means. For example, lip 21 may have an electromagnet embedded therein or attached thereto which can be energized and deenergized to make and break such seal. Mechanical and/or pressure seals including inflatable seals may also be used.

Vessel 21 is also provided with a loop 21–2 for engagement with hook means, not shown, for inversion of vessel 21. Pivotable lift and turn means may also be employed to engage workpiece 41 after sealing is effected to bring workpiece 41 and vessel 21 into the inverted position shown in FIGURE 2 and to return the same to the position shown in FIGURE 1.

By way of example but not of limitation, the coating bath 23 may be an aqueous dispersion of a paint conventionally classified as a colored prime coating material in which case the electrodeposited film may be subsequently spray coated with a clear or lightly pigmented transparent coating material through which the color of the electrodeposit is visible, or an aqueous dispersion of what is conventionally termed a single coat enamel. Also, the pigment-binder ratio and the type and size of pigment or filler particles may be varied to provide a contrast of appearance between the electrodeposited coating from vessel 21 and the subsequent electrodeposit upon immersion of the workpiece.

An exemplary coating bath is prepared in the following manner:

An extended coupled glyceride drying oil paint binder is made by reacting in an agitator tank 8,467 parts of alkali-refined linseed oil and 2,025 parts of maleic anhydride (heated together at 232.2° C. for about three hours until an acid value of 80–90 results), then cooling this intermediate to 157.2° C., adding 1,789 parts of vinyl toluene containing 48 parts of ditertiary butyl peroxide and reacting at 218.3° C. for about an hour. The resulting vinyl toluenated material is then cooled to 157.2° C. and 5,294 parts of non-heat reactive, thermoplastic, oil-soluble phenolic resin is added, the temperature raised to 232.2° C. and the mixture held one hour. The phenolic resin is a solid lump resin having softening point of 120–150° C., specific gravity of 1.03–1.05 at 20° C., and has been stripped to get out excess phenol and low molecular weight materials. It is a condensation product of about equimolar quantities of para tertiary butyl phenol and formaldehyde. The electrical equivalent weight of the resulting acid resin as extended is about 1,640, and it has acid number of 65.

The material then is cooled to 93.3° C., and 1,140 parts are taken for forming a paint dispersion. To these 1,140 parts, 100 parts of water are added, then 13.6 parts of triethylamine, the mixture agitated for a few minutes, then 74 more parts of water and 92.5 parts diisopropanol amine added. This mixture is further reduced with 1,825 parts water and 32.5 parts diethylene triamine while agitation is continued.

To this paint dispersion there is added 50 parts of a treating mixture of mineral spirits, a light hydrocarbon liquid having A.P.I. gravity of 45–49.5, specific gravity at 15.6° C. of 0.78–0.80, flash point (Cleveland Open Cup) between 37.8–46° C., a negative doctor test and no acidity, 12 parts of a wetting agent (the oleic ester of sarcosine, having a maximum of 2% free fatty acid, a specific gravity of 0.948, color on the Gardner scale of 6, and a molecular weight of 340–350). This material is compatible with the paint dispersion; no distinct hydrocarbon phase results either at this time, even though a substantial amount of hydrocarbon (predominantly aliphatic) has been used, nor after further addition of the pigment grind and addition of extra water to make the initial painting bath.

A pigment grind is made from 123 parts of vinyl-toluenated, maleic-coupled linseed oil made in the same manner as the resin hereinbefore shown in this example (except that the resulting polycarboxylic acid resin is not extended with the phenolic resin), 8.4 parts of diisopropanol amine, 0.7 part of an antifoam agent (a ditertiary acetylenic glycol with methyl and isopropyl substitution on the tertiary carbon atoms), 233 parts of fine kaolin clay, 155 parts of pigmentary titanium dioxide, 7.8 parts of fine lead chromate, 15.5 parts of fine red iron oxide, 16.9 parts of carbon black, and 201 parts of water. The resulting pigment grind is then blended with the foregoing paint dispersion and treating mixture to make a concentrated paint. The resulting paint is reduced further with water in the ratio of one part of the resulting paint per 5 parts of water to make an initial painting bath for electropainting operations. The resulting bath has resin solids (non-volatile matter) concentration of 7.24%. The total of amine equivalents used in making up the initial bath is about 4.5 times the minimum amount necessary to keep this polycarboxylic acid resin, once dispersed, in anionic polyelectrolyte condition in the bath and about 1.25 times full neutralization of the acid resin with respect to its acid number. The number of coulombs of direct current used to electroplate a gram of this resin on an anode at minimum amine concentration in the bath to develop requisite polyelectrolyte characteristics for my coating process is virtually constant at 24. Specific resistance of the initial bath is about 900 ohm-centimeters.

The replacement paint solids are made by dispersing 1,140 parts of the same kind of extended polycarboxylic acid resin with 100 parts of water and 13.6 parts of triethylamine. To this is added the mineral spirits, the wetting agent, and the foregoing pigment grind, all of the same compositions and in proportions as are used to make up the original paint dispersion for the bath.

The immersion bath subsequently employed to coat the remainder of the workpiece may be of the same composition with different pigmentation or may be one of the other commercially available paints designed for electrodeposition coating. In a typical example, the electrodeposition is carried to completion from vessel 21 with a difference of potential between electrode 25 and workpiece 41 maintained at 200 volts and the immersion coating subsequently carried out at 160 volts.

In this application, "painting" by electrodeposition is meant to include the deposition of finely ground pigment and/or filler in the ionizable resin herein referred to as the binder, the deposition of binder without pigment and/or filler or having very little of same, but which can be tinted if desired, and the deposition of other water reducible surface coating compositions containing the binder which might be considered to be broadly analogous to enamel, varnish, or lacquer bases, and the coating material for such deposition is termed a "paint." Thus, the binder, which is converted to a water-resistant film by the electrodeposition and ultimately converted to a durable film resistant to conventional service conditions by final curing, can be all or virtually all that is to be deposited to form the film, or it can be a vehicle for pigmentary and/or mineral filler material or even other resins on which it exerts the desired action for depositing the film. The preferred resins for anodic deposition have an acid number between about 30 and about 300 and an electrical equivalent weight between about 1,000 and about 20,000. The term "electrical equivalent weight" is employed herein to mean that amount of resin or resin mixture in grams that will deposit per Faraday of electrical energy input. The conditions, procedures, and calculations which can be employed to determine electrical equivalent weight are set forth in detail in the aforementioned U.S. Patent 3,230,162.

The foregoing examples are solely for purposes of illustration and should not be considered as limitations upon the true scope of the invention as set forth in the appended claims.

I claim:

1. The method of forming a design coating upon an electrically conductive workpiece which comprises positioning the workpiece over a vessel having an opening of predetermined configuration defined by a peripheral lip, said vessel containing a coating bath comprising an aqueous dispersion of an electrodepositable organic resin characterized in that the film formed by its electrodeposition increases in electrical resistance in direct relation to its depth, positioning a first electrode in relation to said coating bath so as to be in contact with said bath when said vessel is inverted, providing a water-tight seal between said peripheral lip and said workpiece, inverting said workpiece and said vessel, providing a direct current flow of electrical energy through said bath between said electrode and said workpiece with resultant electrodeposition of a continuous film of said resin upon that portion of the surface of said workpiece in contact with said bath and essentially defined by said lip, inverting said vessel and said workpiece and breaking said seal.

2. The method of claim 1 wherein said bath comprises an aqueous dispersion of a pigmented polycarboxylic acid resin.

3. The method of forming a design coating upon an electrically conductive workpiece which comprises positioning the workpiece over a vessel having an opening of predetermined configuration defined by a peripheral lip, said vessel containing a first coating bath comprising an aqueous dispersion of an electrodepositable paint characterized in that the film formed by its electrodeposition increases in electrical resistance in direct relation to its depth, positioning a first electrode in relation to said coating bath so as to be in contact with said bath when said vessel is inverted, providing a water-tight seal between said peripheral lip and said workpiece, inverting said workpiece and said vessel, providing a first difference of electrical potential between said electrode and said workpiece and a direct current flow of electrical energy through said first coating bath between said electrode and said workpiece with resultant electrodeposition of a continuous film of said paint from said first coating bath upon that portion of the surface of said workpiece in contact with said bath and essentially defined by said lip, inverting said vessel and said workpiece, and breaking said seal, polymerizing the resultant electrodeposited coating upon said workpiece, immersing said workpiece in a second coating bath, said second coating bath comprising an aqueous dispersion of a second electrodepositable paint, providing a second difference of electrical potential between said workpiece and another electrode in contact with said second coating bath and electrodepositing said second paint upon said workpiece, said second difference of electrical potential being insufficient to effect electrodeposition of a water-insoluble coating over the polymerized coating previously electrodeposited from said first coating bath.

4. The method of claim 3 wherein said second difference of electrical potential is less than said first difference of electrical potential.

References Cited

UNITED STATES PATENTS

| | | | |
|---|---|---|---|
| 3,254,004 | 5/1966 | Jackson et al. | 204—181 |
| 3,391,065 | 7/1968 | Gerhard | 204—15 |

HOWARD S. WILLIAMS, Primary Examiner

U.S. Cl. X.R.

204—15, 299